US012190599B2

(12) United States Patent
Chan et al.

(10) Patent No.: US 12,190,599 B2
(45) Date of Patent: Jan. 7, 2025

(54) IMAGE ANNOTATION TOOLS

(71) Applicant: Five AI Limited, Bristol (GB)

(72) Inventors: Ying Chan, London (GB); Sina Samangooei, Cambridge (GB); John Redford, Bristol (GB)

(73) Assignee: Five AI Limited, Cambridge (GB)

( * ) Notice: Subject to any disclaimer, the term of this patent is extended or adjusted under 35 U.S.C. 154(b) by 0 days.

(21) Appl. No.: 18/011,069

(22) PCT Filed: Aug. 20, 2021

(86) PCT No.: PCT/EP2021/073128
§ 371 (c)(1),
(2) Date: Dec. 16, 2022

(87) PCT Pub. No.: WO2022/038260
PCT Pub. Date: Feb. 24, 2022

(65) Prior Publication Data
US 2023/0230384 A1 Jul. 20, 2023

(30) Foreign Application Priority Data
Aug. 21, 2020 (GB) ...................................... 2013100

(51) Int. Cl.
*G06V 20/56* (2022.01)
*G06T 7/70* (2017.01)
(Continued)

(52) U.S. Cl.
CPC ............... *G06V 20/56* (2022.01); *G06T 7/70* (2017.01); *G06V 10/44* (2022.01); *G06V 20/70* (2022.01);
(Continued)

(58) Field of Classification Search
CPC .............................................. G06V 20/56–588
See application file for complete search history.

(56) References Cited

U.S. PATENT DOCUMENTS

| 5,602,937 A | * | 2/1997 | Bedrosian ................. G06T 7/75 |
| | | | 382/218 |
| 11,037,024 B1 | * | 6/2021 | Ratti ......................... G06T 7/11 |

(Continued)

FOREIGN PATENT DOCUMENTS

WO 2019175286 A1 9/2019

OTHER PUBLICATIONS

International Search Report, PCT/EP2021/073128, Date: Nov. 16, 2021; By: Authorized Officer: Stan, Johann.

(Continued)

*Primary Examiner* — Frank Johnson
(74) *Attorney, Agent, or Firm* — Andrew J. Tibbetts; Samuel S. Stone; Greenberg Traurig, LLP

(57) ABSTRACT

A method of annotating known objects in road images captured from a sensor-equipped vehicle, the method implemented in an annotation system and comprising: receiving at the annotation system a road image containing a view of a known object; receiving ego localization data, as computed in a map frame of reference, via localization applied to sensor data captured by the sensor-equipped vehicle, the ego localization data indicating an image capture pose of the road image in the map frame of reference; determining, from a predetermined road map, an object location of the known object in the map frame of reference, the predetermined road map representing a road layout the map frame of reference, wherein the known object is one of: a piece of road structure, and an object on or adjacent a road; computing, in an image plane defined by the image capture pose, an object projection, by projecting an object model of the known object from the object location into the image plane; and storing, in an image database, image data of the road image, in association with annotation data of the object projection for annotating (Continued)

the image data with a location of the known object in the image plane.

20 Claims, 12 Drawing Sheets

(51) Int. Cl.
  *G06V 10/44* (2022.01)
  *G06V 20/70* (2022.01)
(52) U.S. Cl.
  CPC ............... *G06T 2207/20081* (2013.01); *G06T 2207/20132* (2013.01); *G06T 2207/30244* (2013.01); *G06T 2207/30252* (2013.01)

(56) References Cited

U.S. PATENT DOCUMENTS

| | | | | |
|---|---|---|---|---|
| 2007/0047809 | A1* | 3/2007 | Sasaki | G06V 20/56 |
| | | | | 382/170 |
| 2016/0221592 | A1* | 8/2016 | Puttagunta | B61L 25/025 |
| 2018/0025632 | A1* | 1/2018 | Breed | G01C 21/3826 |
| | | | | 701/93 |
| 2018/0188046 | A1* | 7/2018 | Akiva | G01C 21/005 |
| 2018/0239968 | A1 | 8/2018 | Gupta et al. | |
| 2018/0350094 | A1* | 12/2018 | Wang | G06T 7/292 |
| 2018/0365888 | A1* | 12/2018 | Satzoda | G05D 1/0251 |
| 2019/0026917 | A1* | 1/2019 | Liao | G06V 10/82 |
| 2019/0080608 | A1* | 3/2019 | Lee | G01S 19/42 |
| 2019/0197778 | A1* | 6/2019 | Sachdeva | G06T 11/001 |
| 2020/0082621 | A1* | 3/2020 | Son | G06F 3/011 |
| 2020/0210726 | A1 | 7/2020 | Yang | |
| 2020/0242378 | A1 | 7/2020 | Kim | |
| 2022/0397686 | A1* | 12/2022 | Scacchi | G01S 19/485 |

OTHER PUBLICATIONS

Liu Dongfang et al, "Virtual World Bridges the Real Challenge: Automated Data Generation for Autonomous Driving", 2019 IEEE Intelligent Vehicles Symposium (IV), IEEE, Jun. 9, 2019 (Jun. 9, 2019), p. 159-164.

Zhou Jingkai et al, "Scale adaptive image cropping for UAV object detection", Jul. 31, 2019 (Jul. 31, 2019), vol. 366, p. 305-313.

* cited by examiner

Annotation interface

IMAGE ANNOTATION TOOLS

CROSS-REFERENCE TO RELATED APPLICATIONS

This application is the U.S. National Stage application, pursuant to 35 U.S.C. § 371, of PCT International Patent Application No. PCT/EP2021/073128, filed Aug. 20, 2021, designating the United States and published in English, which claims priority under 35 U.S.C. §§ 119 and 365 to Great Britain Patent Application No. 2013100.9, filed Aug. 21, 2020. The contents of each of the aforementioned applications are incorporated herein by reference in their entirety.

TECHNICAL FIELD

The present disclosure pertains to methods of annotating images with the locations of known objects, and to computers and computer programs for implementing the same. Applications of the method include machine learning (ML) training, and scenario extraction e.g. in an autonomous vehicle context.

BACKGROUND

Image recognition means extracting information from images using some form of pattern recognition applies to their image content. State of the art performance on image recognition tasks has been driven by advances in Machine Learning (ML) and computer vision.

Image recognition has numerous practical applications. Such applications include autonomous vehicles and other robotic systems. An autonomous vehicle (AV), also known as a self-driving vehicle, refers to a vehicle which has a sensor system for monitoring its external environment and a control system that is capable of making and implementing driving decisions automatically. Other mobile robots are being developed, for example for carrying freight supplies in internal and external industrial zones. Such mobile robots would have no people on board and belong to a class of mobile robot termed UAV (unmanned autonomous vehicle). Autonomous air mobile robots (drones) are also being developed.

An autonomous vehicle or other mobile robot may encounter many types of object that it is required to recognize and interpret, including static objects in the environment (such as traffic lights or other traffic signalling devices, road signs, road markings etc.) or dynamic objects (such as lights on another vehicle used for signalling—e.g. brake lights, indicator lights, headlights etc.). For signalling objects (whether static or dynamic), the ability to accurately and reliably detect a visual state of the signalling object, from multiple possible states, may be safety-critical.

Computer vision (CV) is a class of machine learning (ML) in which models are trained to recognize patterns in images. State of the art CV models, such as convolutional neural networks (CNNs), typically require large amounts of training data, in the form of suitably annotated images, to perform effectively.

SUMMARY

A core issue addressed herein is that of annotation efficiency. Manual annotation is a time consuming task, prone to human error. For example, in an autonomous driving context, it may be necessary to annotate a large number of road images with numerous objects, such as road markings, road signs, central reservations, zebra crossings, traffic lights etc. Note, the term object us used broadly herein to refer to any visible piece of structure.

The present disclosure recognises that state of the art tools that have been developed to facilitate autonomous driving can be re-purposed in an annotation context, to provide automated or semi-automated image annotation requiring minimal (of any) manual correction. Specifically, state of the art vehicle localization techniques, together with HD maps that can now provide centimetre-level accuracy mapping of road structure and surrounding objects, can be leveraged in this context to allow fast (and potentially entirely automated) annotation of such static map objects in images. Note that "static" in the present context means the object location in the world frame of reference is assumed to be fixed (but could encompass such objects with moving components).

A first aspect herein provides a method of annotating known objects in road images captured from a sensor-equipped vehicle, the method implemented in an annotation system and comprising:

receiving at the annotation system a road image containing a view of a known object;

receiving ego localization data, as computed in a map frame of reference, via localization applied to sensor data captured by the sensor-equipped vehicle, the ego localization data indicating an image capture pose of the road image in the map frame of reference;

determining, from a predetermined road map, an object location of the known object in the map frame of reference, the predetermined road map representing a road layout the map frame of reference, wherein the known object is one of: a piece of road structure, and an object on or adjacent a road;

computing, in an image plane defined by the image capture pose, an object projection, by projecting an object model of the known object from the object location into the image plane; and storing, in an image database, image data of the road image, in association with annotation data of the object projection for annotating the image data with a location of the known object in the image plane.

In other words, localization is used in this context to locate the vehicle on or in the predetermined road map, so that the locations of map objects within images captured by the vehicle can be annotated via projection of map objects into the images. The predetermined map could, for example, be a 3D map or a "top-down" (bird's-eye view) map. The method can be applied to any type of known object represented on the map, including road markings, road signs, central reservations, zebra crossings, traffic lights etc The invention can be usefully applied in many practical context, but is particularly well-suited to autonomous driving. Localization is used to determine an image capture location of the image in the world, which in turn yields its location relative to the known object. In an AV context, the level of localization precision and accuracy required for, say, level 4 or level 5 autonomy is more than sufficient to leverage in the present context. High definition maps of the kind used in autonomous driving can yield particularly accurate results.

The localization may be performed off-line within the annotation system, or it may have been performed online when the images were captured, and the ego localization data recorded for later use. With off-line localization, it is generally possible to obtain even more accurate localization data, further reducing annotation error compared with online localization data only. Localization can be applied to any suitable type of sensor data (including mage data of the images themselves, satellite positioning data, IMU data, lidar data etc.) captured by the sensor-equipped vehicle, or multiple sensor modalities combined e.g. using filtering.

Applications of the techniques include training and scenario extraction.

That is, in embodiments, the method may comprise the step of using the image data and the associated annotation data to train an image recognition component to recognize features of the known object.

The method may be applied the method is applied in order to extract a scenario for running in a simulator. In this context, the purpose of the annotation is to provide a semantic representation of a scene captured in a series of images, that can be used to extract a scenario in a suitable scenario description language or other format that can form the basis of a simulation. Simulation is an increasing important tool in autonomous vehicle development.

The annotation data may be generated automatically by applying a correction to the object projection using at least one additional piece of information about the known object (contextual information).

For example, the object projection could be an input to a self-supervised learning signal, along with the contextual information. Self-supervised learning is a form of unsupervised learning where the data itself provides the supervision (e.g. by way of a self-supervised loss function).

Alternatively, the annotation data may be generated semi-automatically by: displaying the image data on an annotation interface, and using the object projection to annotate the displayed image data with an initial location of the object; and receiving manual correction for correcting the initial location, the annotation data generated based on the manual correction.

The image data may be extracted from within a crop region defined by the object projection, the initial location being a predetermined location within the crop region.

Corrections to the annotation data (whether manual or automatic using some additional piece of information about the object) are also a useful indicator of errors in the original localization data. This can be leveraged as a means of improving the accuracy ego localization data. That is, by correcting the ego localization data to be (more) consistent with the corrected annotations. This assumed the road map to be a "ground truth" i.e. any annotation errors are assumed to come from the ego localization data, not the road map.

In general, state of the art localization techniques are more prone to orientation error than positional error. Where this is the case, the ego localization correction can be simplified further by assuming that annotation errors have arisen from orientation localization errors only (taking position localization data as ground truth).

The automatically or semi-automatically generated annotation data may be used to apply a correction to the ego localization data, and thereby generate corrected ego localization data consistent with the annotation data.

The correction may be applied to orientation data of the ego localization data, without modifying position data of the ego localization data.

The method may be applied to at least two road images, with manual or automatic corrections applied to the object projections for the at least two images to generate respective annotation data for the at least two road images, the ego localization data indicating respective image capture poses for the at least two road images.

The at least two road images may form part of a time sequence of road images, the ego localization data indicating an image capture pose for each road image of the time sequence;

wherein the method may comprise, for at least a third road image of the time sequence of images:
computing an object projection for the third road image, by projecting the object model into an image plane defined by the image capture pose of the third road image, and
using the object projection computed for the third road image to automatically generate annotation data for annotating image data of the third road image with a location of the known object, via interpolation or extrapolation of the manual or automatic corrections applied to the at least two images.

The interpolation or extrapolation may be linear interpolation or extrapolation.

Linear interpolation/extrapolation is viable because of the non-linear effects of the vehicles motion will have largely been accounted for in the way that object projections are generated. As noted, in practice the main source of error in the localization data is likely to be orientation error. Even if that error is relatively large, provided it behaves in an essentially linear way, linear interpolation or extrapolation can be applied based on a small number of manual or automatic corrections.

The image data of each of the road scene images is extracted from a crop region defined by the object projection computed for that image, wherein said interpolation or extrapolation is used to determine an offset from a predetermined location within the crop region of the third road scene image.

The annotation data may include a type of the known object derived from the predetermined object.

The road image may be one of a time sequence of road images, the ego localization data having been computed in the map frame of reference by applying vision-based localization to the time sequence of images, the sensor data comprising data of the images.

Alternatively, the ego localization data may have been computed in the map frame of reference by applying non-vision-based localization to at least one other type of sensor data associated with the image.

Alternatively, the ego localization data may have been computed using a combination of vision-based and non-vision based localization.

The road map may be a High-Definition Map for use in autonomous driving.

In some embodiments, the object projection may be used to rescale the image for annotation. The annotation data is generated for the rescaled image in that event.

A challenge for image recognition is that an object (or similar objects) might appear at different scales in difference images because those images have been captured at different distances from the objects (i.e. different depths). In autonomous driving, there are contexts where it is vital that an AV is able to recognize certain types of object close up but also from a significant distance. Traffic lights fall into this category as an AV planner needs to be able to respond effectively to traffic light state changes over a large distance range.

Herein, the scale of an object view means the correspondence between pixels of the object view in the image (object pixels) and distance in the world. An object is said to be captured at the same scale in two images if the pixel heights and/or widths of the object views in the images are substantially the same.

For an ML image recognition component to be able to recognize objects at very different scales within images, it typically needs to have been trained a sufficient number of training images that are representative of the different scales at which it is required to operate.

However, training an ML component to recognize a particular type of object when objects of that type always appear at essentially the same scale in the images is a simpler task that generally requires less training data to achieve similar performance.

The rescaled image may be a relatively low resolution image, such that the pixel height and width of the object in the re-scaled is of the order or 10s or 100s of pixels only. This is sufficient for various image recognition problems encountered in autonomous driving, including traffic light detection or similar tasks where the aim is to recognize different traffic signalling states designed to be readily visually distinguishable by human drivers even at a distance (such that fine-grained details are not required). In this case, using state of the art odometry/localization in conjunction with high-definition maps developed for autonomous driving, tests have demonstrated the ability to rescale objects to the same scale within one pixel or so over a wide range of object depths, from a few meters to at least 100 meters or more (FIG. 6 shows some examples of rescaled images obtained using the present techniques for different object distances). This, in turn, makes it possible to achieve high performance with an extremely light-weight image recognition component, such as a light-weight convolutional neural network.

Further aspects provide a computer system comprising one or more computers configured to implement the method or any embodiment thereof, and a computer program for programming a computer system to implement the method.

BRIEF DESCRIPTION OF FIGURES

For a better understanding of the present disclosure, and to show how embodiments of the same may be carried into effect, reference is made by way of example only to the following figures, in which.

DETAILED DESCRIPTION

Figure 1:
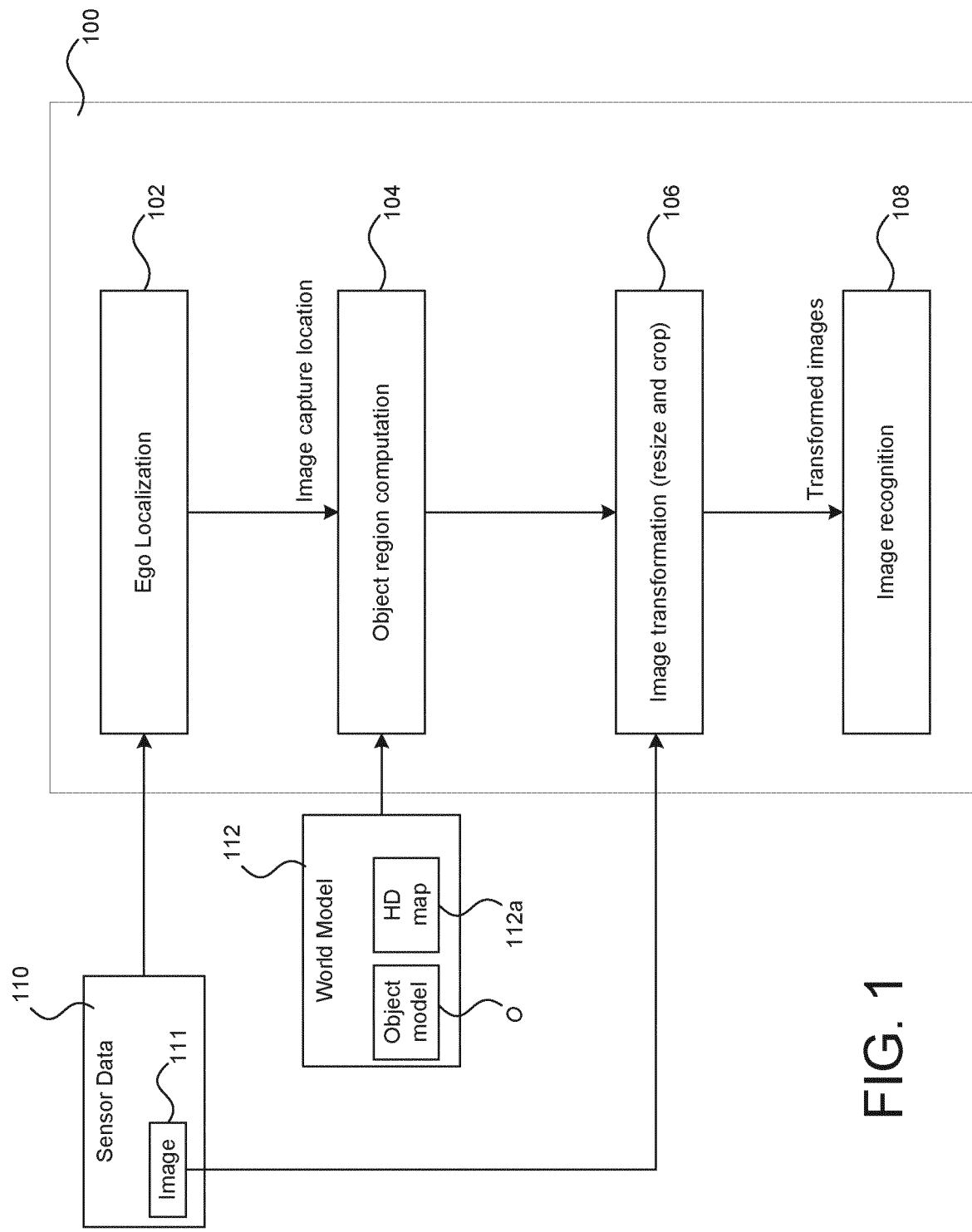
FIG. 1 shows a schematic function block diagram of an image processing system.

FIG. 1 shows a schematic function block diagram of an image processing system 100, shown in turn to comprise an ego localization component 102, an object region computation component 104, an image transformation component 106 and an image recognition component 108.

The image processing system 100 receives an image sequence 111 containing views of a known object at different scales. For example, in a driving context, the known object could be a static object (such as a traffic light, road sign, or other traffic control object) that a sensor-equipped vehicle is approaching. As successive images of the object are captured from the vehicle, the scale of the object will increase across the sequence of images as the object is approached (that is, the object will appear larger in later images captured closer to the object).

A core function of the image processing system is to allow the object view in each of the images to be rescaled to essentially a fixed scale. The image transformation component 106 applied an image transformation to each image in order to compute a transformed image. The transformation comprises image rescaling, and may also include other types of transformation.

In the examples described below, a crop region of variable size is computed around the object in each of the images, and the transformed image is a cropped and rescaled image of that region is generated from the original image.

The rescaling is such that the vertical and horizontal extent of the object view in the transformed image as measured in pixels (its pixel width and height in the transformed image) is essentially the same in all of the cropped and rescaled images, and essentially independent of the distance of the object from the sensor-equipped vehicle when the original image was captured (object distance), and essentially independent of its pixel width and height in the original image prior to transformation.

The ability to provide fixed-scale images of an object view—irrespective of the scale at which it was originally captured—has significant benefits in an image recognition context.

Figure 6:
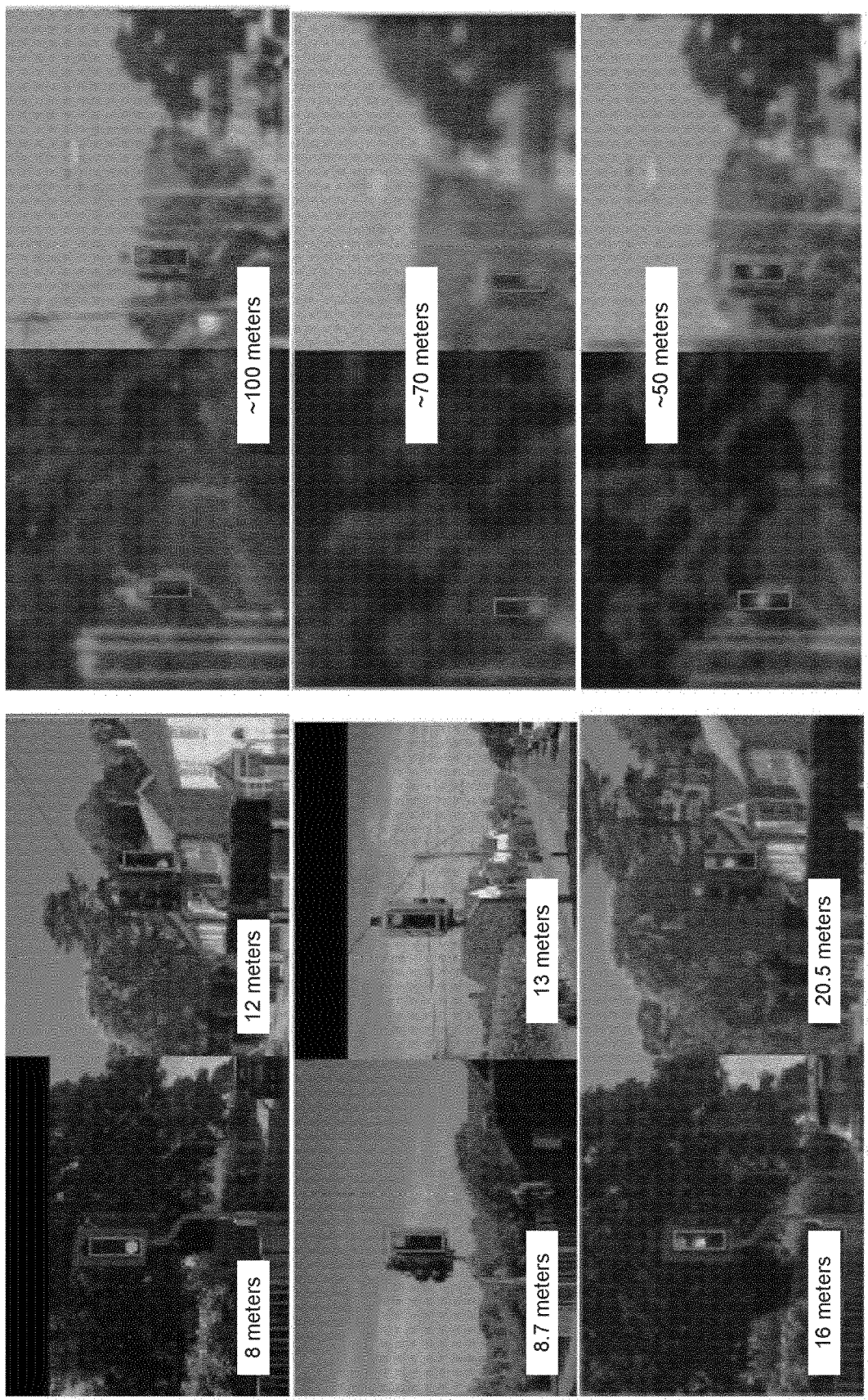
FIG. 6 shows examples of cropped and rescaled images obtained using the described techniques for a range of object distances.

For example, when training a machine learning (ML) image recognition component to extract information about a particular type of object from images in which the object might appear at different scales, a sufficient number of training images will be needed that capture the object at a representative range of scales. By contrast, if the image recognition component 108 of FIG. 1 is implemented using ML model(s), those models need only be capable of recognizing features of the object at essentially a fixed scale. This, in turn, reduces the training data requirements, making it possible to achieve a given level of performance with less training data. FIG. 6 shows examples of transformed images obtained using the described image processing techniques, for a range of object distances, annotated with 2D bounding box detections. The bounding boxes were detected using an extremely light-weight convolutional neural network (CNN), made possible by the automatic rescaling of the object views to fixed pixel dimensions.

Moreover, if the object is known to appear in the transformed images at substantially a fixed scale, this potentially means that simpler ruled-based image processing could be applied by the image recognition component 108 in order to recognize the relevant features of the object. For example, in a traffic light detection context, it may be possible to implement rules-based detection based on appropriate assumptions about the pixel sizes of the component lights in the fixed-scale cropped images.

Cropping is not essential—for example, CNNs can receive an image of arbitrary size (pixel dimensions), and are based on convolutions applied uniformly across the area of the image. what is material in that context is the rescaling that significantly simples the pattern recognition task that the CNN needs to learn. Nevertheless, cropping can yield efficiency benefits (the image recognition can be performed using fewer computational resources because there is less extraneous image content to process). The selective image cropping can also potentially improve the reliability of the image recognition process by reducing the amount of extraneous visual information that the image recognition component 108 needs to consider. Removing image data outside of the crop error prevents such data from causing a false detection or other image recognition error.

The following examples implement the rescaling by computing a variable-sized crop region $R_n$ for each image n, containing the object view in the original image n, and rescaling the portion of the image within the crop region $R_n$. This results in a transformed image having fixed pixel dimensions M×N. The size of the crop region relative to the original image n is computed in the manner described below, to ensure that the rescaled object view also has essentially fixed pixel dimensions m×n in the M×N transformed image—see FIG. 2B and accompanying description below. However, it will be appreciated that underlying principles of the rescaling can be implemented in other ways, with or without cropping.

One application of the system 100 is traffic light detection, where the aim is to detect a current state of a set of traffic lights from a discrete set of possible states. This is a significantly simpler problem when traffic lights are always known to appear at essentially the same scale, irrespective of how close or far away they were when the original image was captured.

In order to determine an appropriate crop region for each image, the system 100 uses a "world model" 112 that encodes knowledge about the location of objects within a world frame of reference (the world). The world model 122 encodes a degree of external knowledge of the known object that allows a suitable crop area (region of interest) to be determined before the desired image recognition is applied. In the following examples, that knowledge includes the location of the object in the world frame of reference, and knowledge of its size or dimensions encoded in a predetermined object model O (which takes the form of a simple 3D template for modelling the object).

A function of the ego object localization component 102 is to determine, for each image, an image capture location in the world (i.e. in the same world frame of reference). References below to localization mean ego localization in this sense (unless otherwise indicated). That is, an estimated location, in the world, of an image capture system (camera) when it captured the image. In a driving context, this would be camera of a sensor-equipped vehicle.

Once the locations of the camera and the object are known, this allows the location and extent (approximate dimensions) of the object within the image plane of the image to be determined via projection into the image plane of the image, for the purpose of computing a suitable crop area containing the object view.

Localization is performed using sensor data 110, which could include the image sequence 111 itself (vision-based localization) and/or other type(s) of sensor data, such as one or more lidar, radar, satellite navigation (e.g. GPS), and IMU (inertial measurement unit) data etc. There are many known localization methods that can be used for this purpose depending on the type of sensor data 110 that is available, in the field of autonomous driving and elsewhere. Localization an image capture device in this context means determining its location and orientation (pose) in some fixed world (global) frame of reference of the world model 122. This could, for example, be geographic coordinates (e.g. latitude, longitude), or whatever fixed frame of reference the world model 122 is defined in.

The world model 112 of FIG. 1 is shown to comprise a high-definition (HD) map 112a of static objects within a driving area. HD maps are maps having a sufficient level of detail, precision and accuracy for use in autonomous driving. The HD map 112a allows a known static object of interest to be located in the world. HD maps that describe road structure and surrounding objects with centimetre-level accuracy are available.

The present techniques can be deployed in both "online" and "offline" contexts. In an online context, the image processing may be implemented in real time, to allow e.g. an autonomous vehicle or other robotic system to make perception-driven decisions. For example, in an autonomous driving context, the techniques may be used to provide real-time traffic light detection to allow a planner to plan suitable maneuvers as the vehicle approaches a set of traffic lights.

Offline contexts include the generation of training data, and in that case cropped, fixed-scale images can be derived using the present techniques to be used for training the image recognition component 108.

Another offline context is scenario extraction, where the aim is to extract a relatively high-level scenario that can be deployed in a simulator. For example, in a traffic light detection context, the image recognition component 108 could perform traffic light detection (analogous to the online application) to allow potentially changing traffic light states to be captured in the extracted scenario such that they can be subsequently re-created in a simulator.

In an offline context, the image processing system 100 can be usefully deployed within an annotation system to facilitate automatic or semi-automatic image annotation. Example annotation applications are described below with reference to FIGS. 5 and 6.

Figure 2:
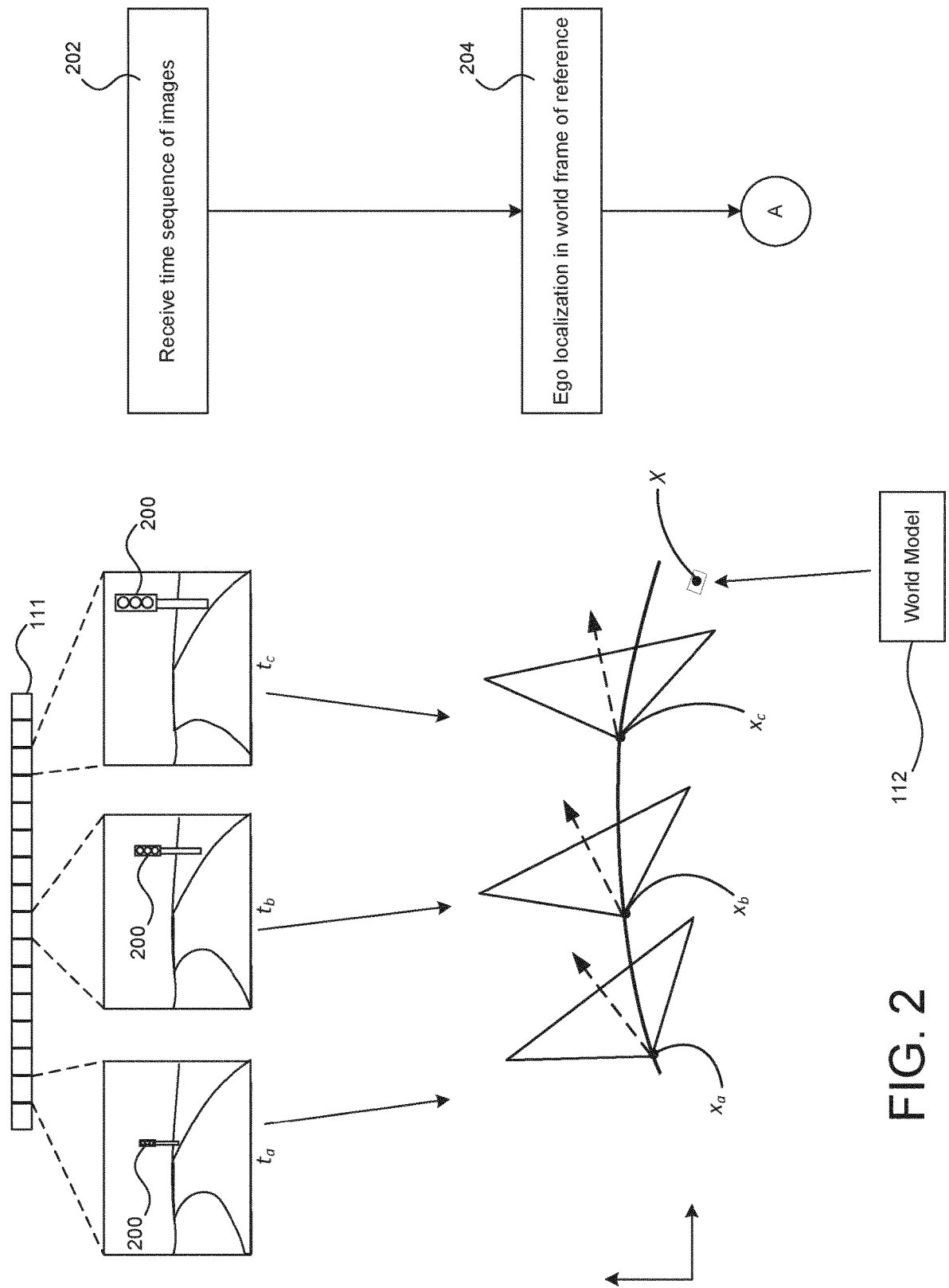
FIG. 2 shows a flowchart for a method of processing images, together with a schematic illustration of the method steps.
Figure 2:
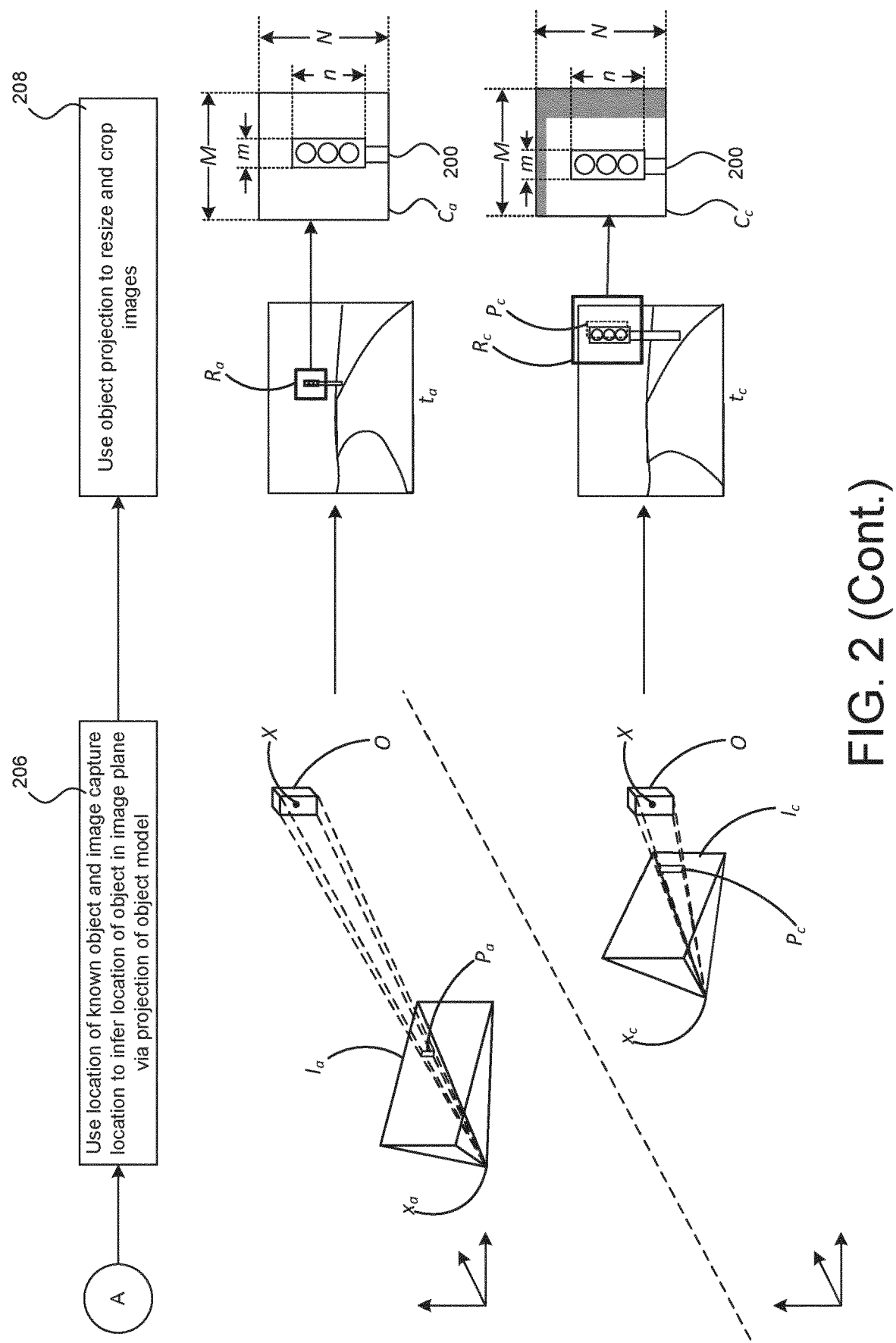

FIG. 2 shows a flowchart for an image processing method implemented by the image processing system 100. To further aid understanding, FIG. 2 also shows a schematic illustration of certain operations performed at each step.

At step 202, time sequence of images 111 is received. In an online context, images of the sequence may be received in real-time as they are captured, with the subsequent steps performed in real time for each successive image. In an offline context, the method may or may not be implemented in real-time depending on the context.

Three possible images of the sequence are depicted, as captured at time instants $t_a$, $t_b$ and $t_c$ respectively (the notation $t_n$ is used to denote the capture time of image n). In this example, the images 111 are captured by a vehicle as it approaches a known object 200, which is depicted as a set of traffic lights. As the vehicle moves closer to the traffic lights 200, the size of the traffic lights 200 in the images relative to the area of the images (the scale of the traffic lights within the images) increases.

At step 204, localization is performed, in order to determine an image capture location of each of the images in the world (one form of localization data). For the aforementioned images a, b and c, the image capture locations are denoted by $x_a$, $x_b$ and $x_c$ respectively and, in the present example, these take the form of 6D poses, encoding a spatial position and orientation of the camera at the respective time instants $t_a$, $t_b$ and $t_c$, in a 3D world frame of reference. As noted, the localization data may be extracted from the image(s) 111 themselves (vision-based localization) and/or other data of the sensor data 110.

A location X of the known object in the world frame of reference is known from the world model 112. This means the location of the known object 200 relative to each image capture location $x_n$ is known.

Figure 2A:
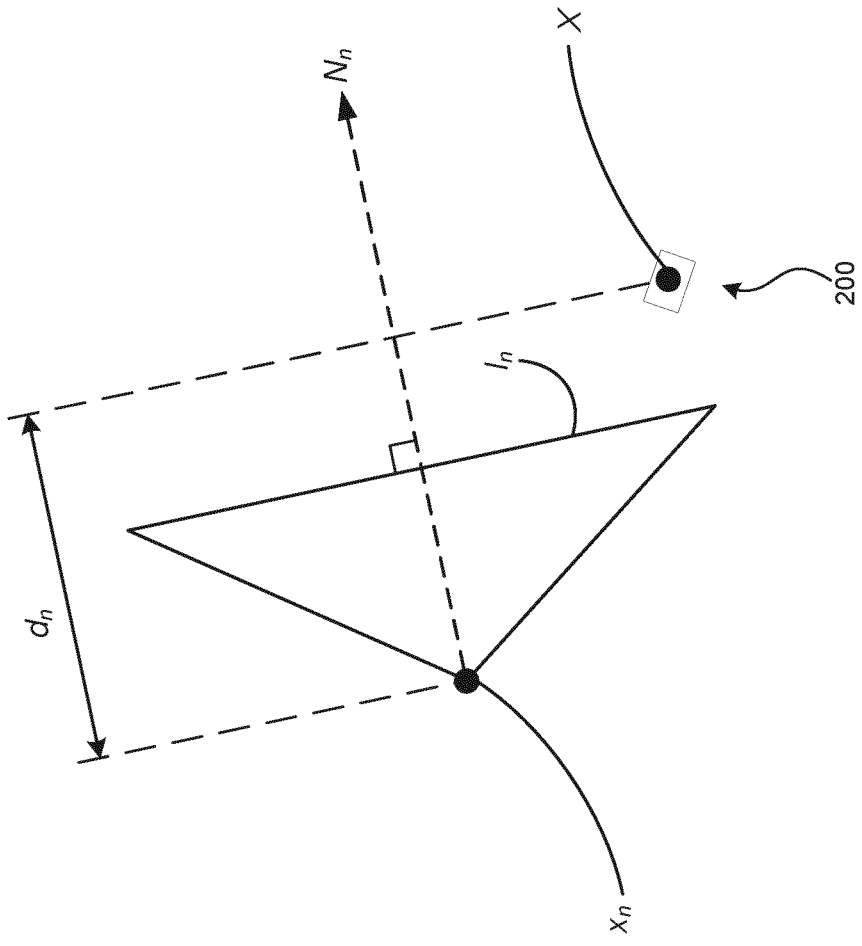
FIG. 2A shows an image capture location and object location defined in a world frame of reference.

FIG. 2A shows an expanded top-down view of the world coordinate system, in which the image capture location $x_n$ for image n and the object location X are defined. The world frame of reference could be 2D, providing a top-down (bird's-eye view) representation of known object(s) in the world, in which case $x_n$ and X are 2D coordinates in the plane of the world coordinate system. Alternatively, the word frame of reference could be 3D (as depicted in the perspective view of step 206 in FIG. 2), in which case $x_n$ and X are 3D coordinates in 3D space. In any event, the world frame of reference spans the direction $N_n$ perpendicular to the image plane $I_n$. The image capture location $x_n$ and object location X lie outside of the image plane $I_n$, and an object distance $d_n$ is defined as the distance of the object 200 from the image capture location $x_n$ in the direction $N_n$ perpendicular to the image plane $I_n$. This object distance $d_n$ defines the scale of the object 200 in the original image n, prior to rescaling.

Returning to FIG. 2, at step 206, the object location X and image capture location $x_n$ are used to locate the object 200 within image n, i.e. within an image plane $I_n$ of the image. The location (spatial position and orientation) of the image plane $I_n$ in the 3D world frame of reference is defined by the 6D camera pose $x_n$. In this example, the world model 112 comprises a 3D model O representing the known object 200, which is projected into the image plane $I_n$ based on the object location X and the image capture location $x_n$. The projection of the object model O in the image plane $I_n$ is denoted by $P_n$. The size of the projection $P_n$ relative to the dimensions of image n (its scale in the original image n) will depend on the location of the object relative to the image capture location $x_n$.

A detailed object model O is not required for this purpose. For example, in many practical applications (including traffic light detection), a simple model such as a cuboid of approximately the correct size may be sufficient.

The object projection $P_n$ defines a crop area $R_n$ containing the view of the object within the image $I_n$. Note that this has been not been detected from the content of the image n itself, but rather has been inferred from the world model based on ego localization. Depending on the type of localization that is used (and whether or not it is vision-based), a degree of image processing may be performed as part of the localization of step 202. However, this is for the purpose of determining the image capture location n rather than for the purpose of recognizing the object 200 in the content of the image n. The crop area $R_n$ is instead computed using the external knowledge encoded in the world model 112, so that image recognition can be subsequently applied to the cropped image.

In the present example, that external knowledge is the location of the object 200 in the world that is encoded in the HD map 112a, and its approximate dimensions encoded in the object model O.

At step 208, each image n is cropped and rescaled, i.e. a rescaled and cropped image of the crop area $R_n$ is generated, by extracting the subset of image data from the original image n that is contained within the crop region $R_n$.

This results in a cropped image $C_n$, containing a view of the object 200 as essentially a fixed scale, that is essentially independent of the object location X and the image capture location $x_n$.

By way of example, FIG. 2 depicts cropped images $C_a$, $C_c$ for images a and c. In the original images a, c the scale of the object 200 is different because they have been captured at different distances from it. However, within the cropped images $C_a$, $C_c$, the scale of the object 200 is essentially the same, because that effect has been compensated by adjusting their respective crop areas $R_a$, $R_c$ to account for the differences in the image capture locations $x_a$, $x_c$.

Figure 2B:
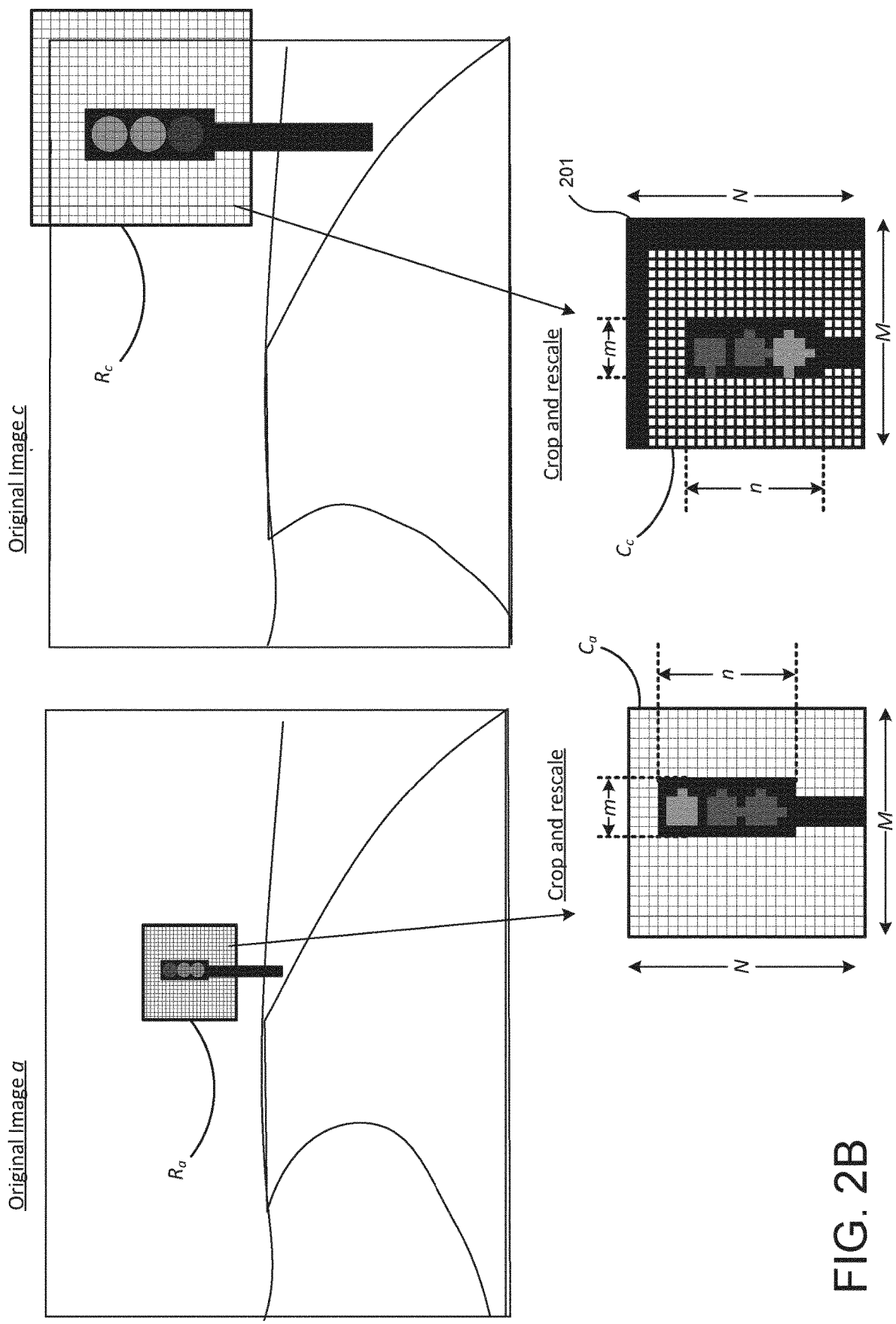
FIG. 2B shows how different sized crop regions may be rescaled to extract cropped and rescaled images having fixed pixel dimensions.

FIG. 2B shows further details of the cropping and rescaling operation applied to example images. The variable-sized crop region $R_n$ for each image n is rescaled to a transformed image $C_n$ of fixed pixel dimensions M×N.

Here, the transformed image is relatively low resolution, such that, with sufficiently accurate localization, it may be possible to achieve the same object dimensions (m×n pixels) across the transformed images to within one pixel or so. As noted above, relatively low resolution images are sufficient for certain image recognition tasks in autonomous driving, such as the detection of visual signalling states designed to be readily perceptible (even from a distance and/or in poor weather, lighting conditions etc.).

The crop region $R_n$ is computed as a function of the object projection $P_n$. For example, the centre of the crop region $R_n$ could be defined to lie at the center of the object projection $P_n$, with a with and height that is some fixed multiple of the width and height of the object projection $P_n$ respectively. This means that, when the crop region is rescaled to M×N pixels, the pixels dimensions m×n of the object across all images will be essentially the same.

Other image processing can also be performed, using the object projection $P_n$ as a reference. For example, a rotation applied to the image can be used to compensate for rotation of the object projection $P_n$ in the image plane $I_n$.

If part of the crop region lies outside of the area of the original image n, as depicted for image c, pixels 201 of the transformed image $C_c$ outside of the original image can be set e.g. to black.

The position of the object 200 within the crop region $R_c$ is a function of orientation localization error, i.e. error in an estimated orientation of the camera, whereas the scale of the object in the original image will be a function of position. Orientation error can mean that the object 200 is not centered in the transformed images, but this is immaterial provided a suitably large crop region is used (large enough to accommodate a realistic range of orientation localization errors). In some practical contexts, including autonomous driving using state of the art localization, it may be possible to achieve a higher level of accuracy and precision on position localization than orientation localization, which is acceptable in the present context because the main cause of rescaling errors would be position localization errors. In other words, a reduction in position localization error yields a reduction in rescaling errors, which is the material factor in this context of a light-weight image recognition component 108. The cropping is a secondary element to improve efficiency, imply that orientation localization error is also a secondary consideration.

Figure 2C:
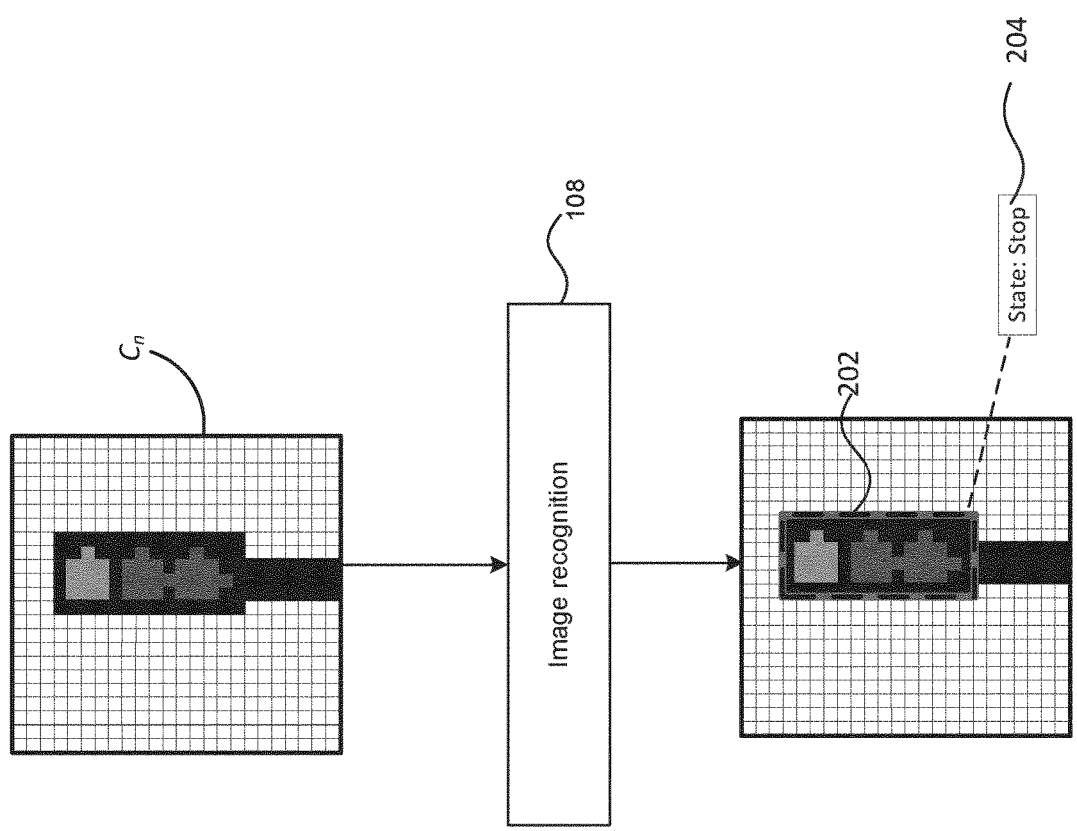
FIG. 2C shows one example of image recognition applied to a cropped and rescaled image.
Figure 3:
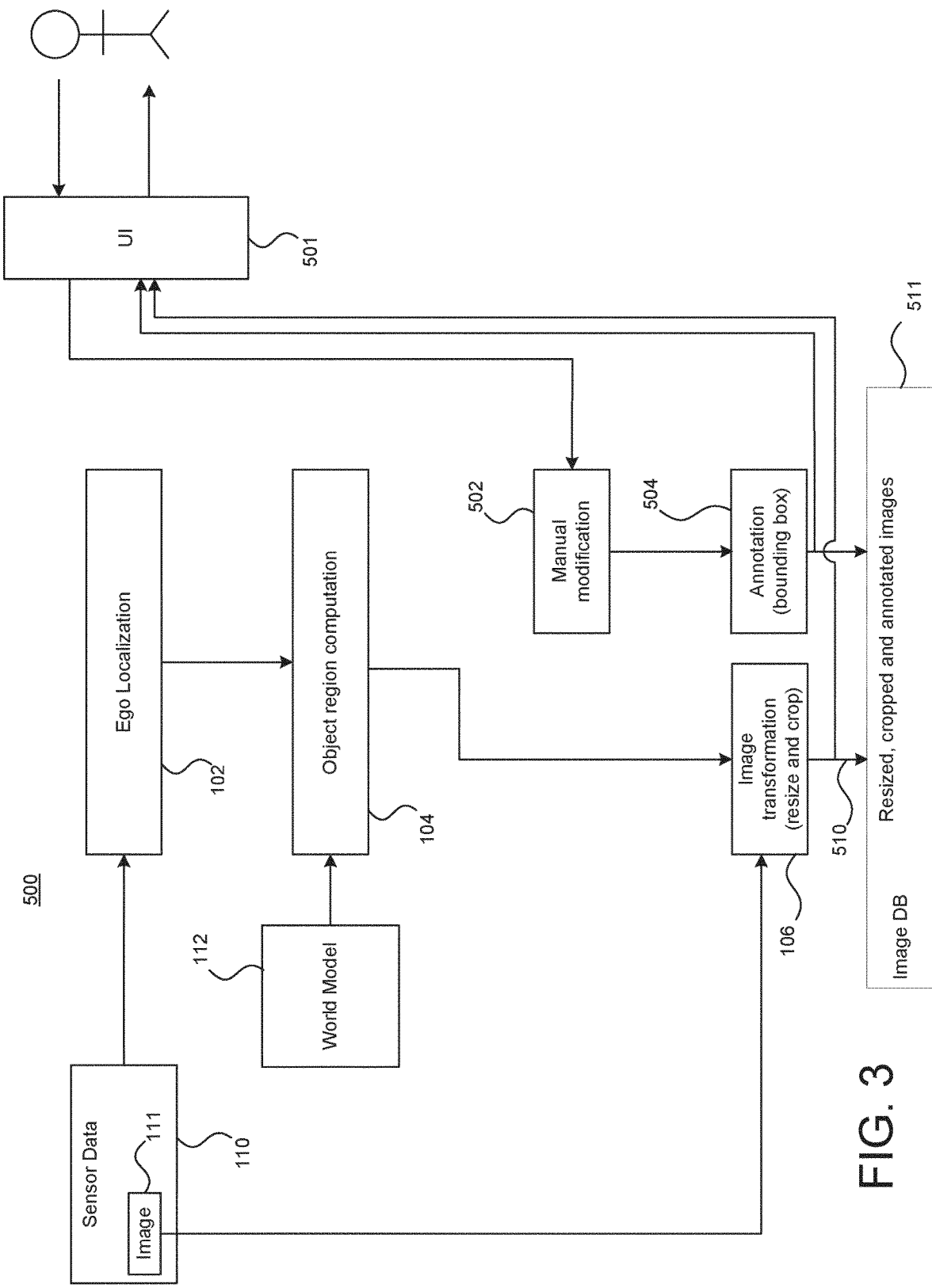
FIG. 3 shows an annotation system for annotating rescaled images of known object.

FIG. 2C shows an example of a transformed image $C_n$ supplied to the image recognition component 108. The output of the image recognition component 108 comprises a detected 2D bounding box 202 for the object 200 in the transformed image $I_n$, and an associated state detection 204 (probabilistic/score-based or deterministic). FIG. 3 consider an annotation system for efficiently generating suitable training images for training the image recognition component 108 on this image recognition task.

FIG. 3 shows a schematic block diagram of an annotation system 500 that incorporates the described image transformation techniques. The annotation system 500 can be used to create annotated images suitable for training an image recognition component 108 of the kind described above with reference to FIGS. 1 and 3, or for other purposes (such as scenario extraction). The annotation system 500 is shown to comprise a localisation component 102, an object region computation component 104 and an image transformation component 106. These are implemented within the annotation system 500 for the purpose of generating transformed (rescaled and cropped) images, so that the transformed images can then be annotated. Although deployed in the context of annotation, these components operate in exactly the same way as the equivalent components of FIGS. 1 and 3. For that reason, the same reference numerals are used, and all of the above description applied to these components in the context of FIG. 3. Similarly, reference numerals 110, 111 and 112 are used to denote, respectively, the sensor data, image sequence and world model on which these operate, noting that, in the annotation system 500, the images 111 and the sensor data 110 are used to generated training images or other transformed images to be annotated for some other use.

An annotation component 504 outputs annotation data for annotating a given transformed image as generated by the image transformation component 106. A manual modification component is provided to allow a human annotator (user) to apply manual corrections to the annotation data.

A user interface 501 is shown to have inputs connected to respective outputs of the image transformation component 106 and the annotation component 504 to allow transformed images to be annotated in accordance with the annotation data. An output of the user interface (UI) 501 is shown connected to an input of a manual modification component 502, representing the ability of the system 500 to receive manual annotation inputs at the UI 501 for applying manual corrections to the annotation data.

Reference numeral 510 is used to denote a transformed image generated by the image transformation component 106 according to the principles described above (equivalent to the transformed image $C_n$ above).

Transformed images are stored with their annotation data in an image database 511, where they can be subsequently accessed.

Figure 3A:
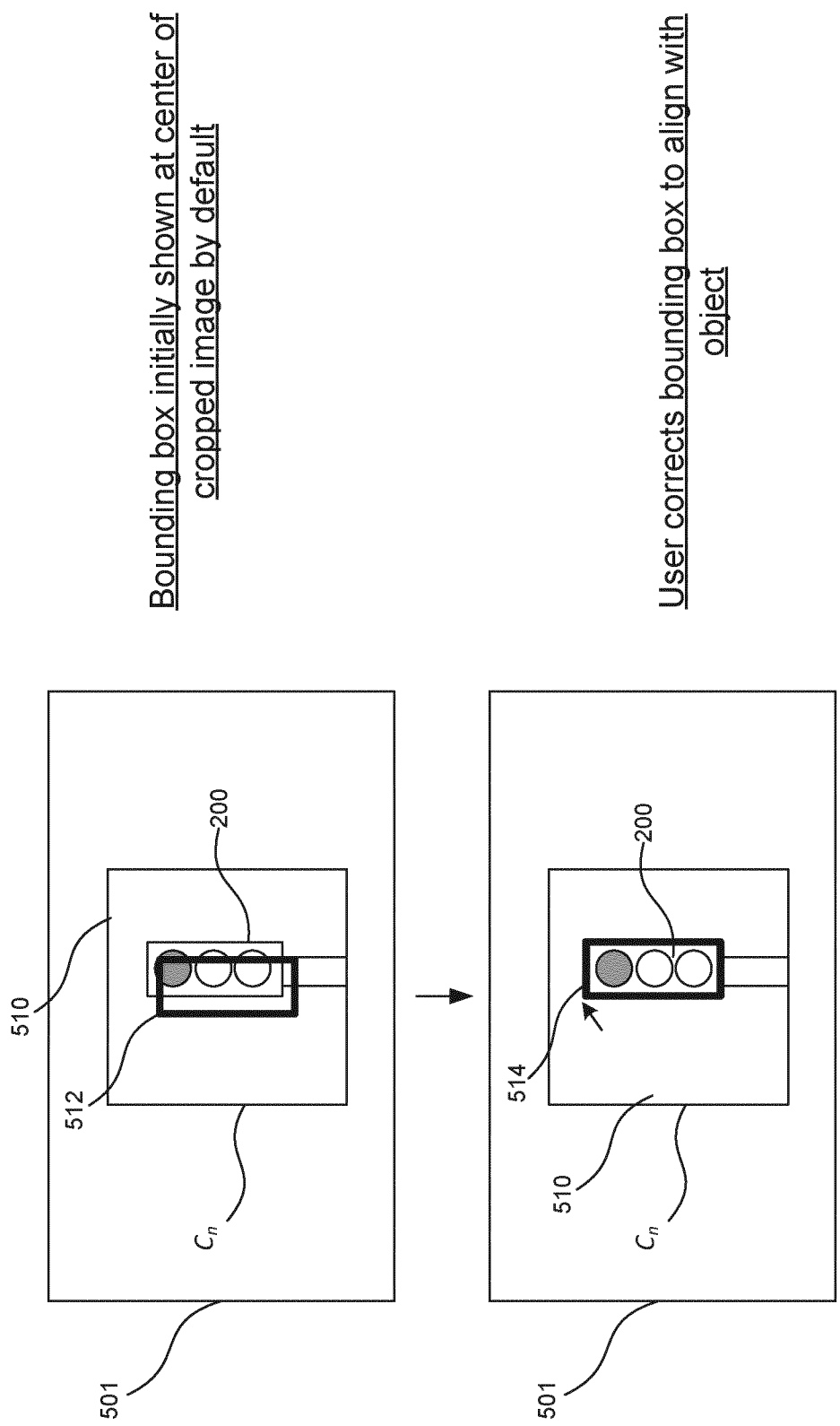

FIG. 3A shows a schematic annotation view provided by the UI 501 on which a transformed image 510 is displayed. In the example of FIG. 3A, the annotation data comprises a 2D bounding box that is to define the location and extent of a view of an object 200 in the transformed image 510. Recall the purpose of the rescaling by the image transformation component 106 is to rescale the object view to a fixed scale, such that is has essentially fixed pixel dimensions m×n in the transformed image 510. Provided the world model 112 and ego localisation are sufficiently accurate, it should therefore be possible to predetermine the bounding box as m×n pixels in all cases. Recall also that the primary source of rescaling error is position localisation error. As noted, the accuracy and precision of position localisation that can now be achieved in the context of autonomous driving is more than sufficient to provide highly accurate rescaling in the present context.

In the absence of orientation localisation error, it should also be the case that the view of the object 200 appears in the transformed image 510 at the location of the object projection $P_n$ used to generate the transformed image 510 (its expected location), e.g. the center point of the transformed image 510 if the original image is cropped to a region centred on the object projection $P_n$. However, orientation localisation error can have the effect of causing deviation in the actual location of the object 200 in the cropped image 510 from its expected location. With current state of the art vehicle localization, orientation localization error is generally expected to be higher than position error. In this case, a manual correction to the location of the bounding box may be needed (even if no correction of its dimensions is needed). The example of FIG. 3A shows a bounding box 512 initially located at the centre of the cropped image 510 (the default or assumed bounding box). Reference numeral 514 denotes a corrected 2D bounding box, as defined by applying a manual correction to the default bounding box 512, in order to better align it with the actual location of the object 200 in the image. In this particular example, no resizing of the default bounding box 512 is necessary, however, options may be provided for adjusting the size of the bounding box (typically by a small amount) if necessary.

Summarizing the above, in the context of annotation, an effect of the rescaling and cropping is to minimise the extent of manual corrections that are needed in the majority of cases. Because the image has been cropped and rescaled, the bounding box can be initially assumed to have a certain size and to be at a certain location relative to the transformed image 510 that should at least be relatively close to the actual object 200 in the cropped image.

Figure 4:
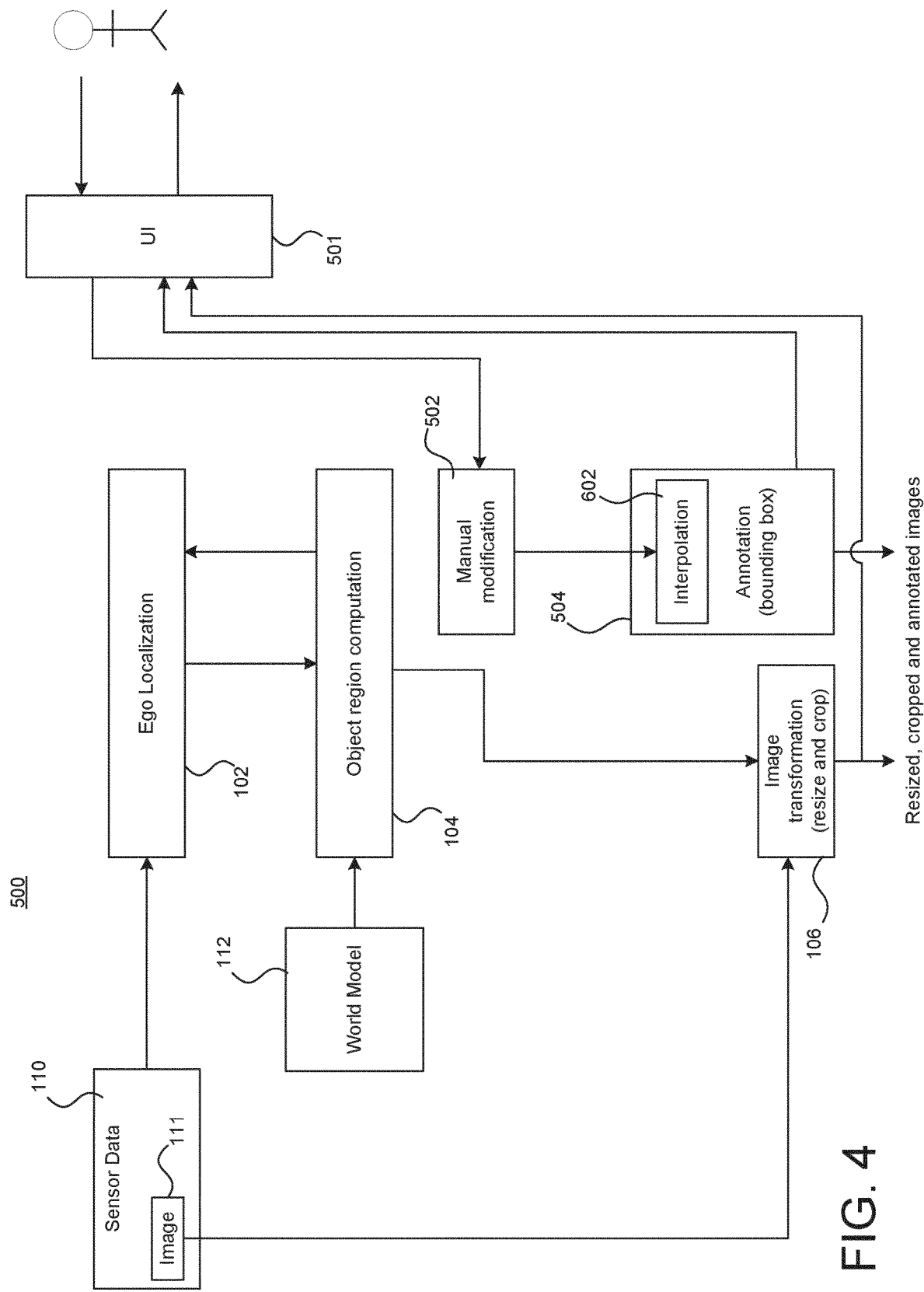
FIG. 4 shows a first extension of the annotation system for efficiently annotating images containing known objects at different scales.

FIG. 4 shows an extension of the annotation system to further improve the efficiency at which images can be annotated. In the system of FIG. 4, the user need only apply manual corrections to a relatively small number of transformed images, and the resulting corrected bounding boxes can then be interpolated or extrapolated through a sequence of transformed images to automatically determine corrected bounding boxes for other images of the transformed sequence.

In FIG. 4, the annotation component 504 is shown to additionally comprise an interpolation component 602 that computes interpolated annotation data based on the user's manual corrections.

Figure 4A:
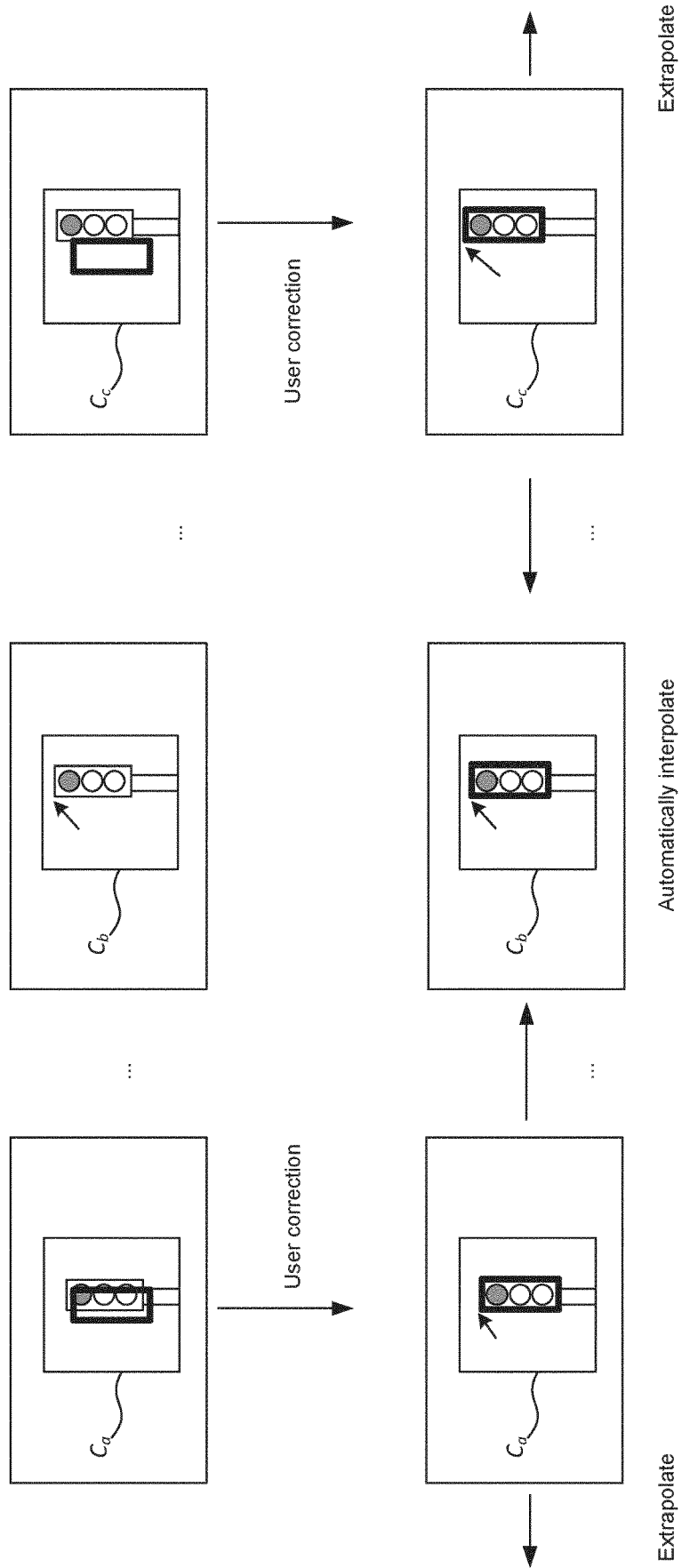
FIG. 4A illustrates how bounding boxes may be computed efficiently for a time sequence of cropped and rescaled images via interpolation/extrapolation of manual annotations.

FIG. 4A schematically illustrates the principles of interpolated annotation by example. In FIG. 4A, transformed images $C_a$, $C_b$ and $C_c$ of the image sequence 111 are shown. In this example, the user applies manual corrections to transformed images $C_a$ and $C_c$, each of which consists, in the depicted example, of a translation of the bounding box to the correct object location in each of those images. The resulting correcting bounding boxes are then linearly interpolated and/extrapolated to compute interpolated bounding boxes for images between $C_a$ and $C_c$ (including image $C_b$ or images before $C_a$ and/or after $C_c$).

As noted, errors in the location of the bounding box—that is, deviation between the actual location of the view of the object 200 in the transformed image 510 from the location of the object projection $P_n$—arise from orientation localisation. Provided orientation error changes in an essentially linear manner across a reasonable sub-sequence of the images, then a simple linear interpolation of the corrected bounding boxes will suffice to provide accurate interpolated or extrapolated bounding boxes. Even if the orientation error is relatively large, provided it is essentially linear every reasonable number of images, the present interpolation techniques will be highly effective.

In other words, the transformation of the images using the above-described object projection techniques largely accounts for any non-linear effects of the vehicle's motion within the world. Therefore, the ability to use linear interpolation effectively in this context is a consequence of the way the images are transformed using the object projection techniques and world model 112 described above.

Once interpolated and/or extrapolated bounding boxes have been computed, the user can scroll through the sequence of images, overlaid with the interpolated or extrapolated bounding boxes as applicable, and if the user observes a point at which the interpolated or extrapolated bounding boxes are starting to deviate significantly from the object locations, he or she can apply a further correction that can then be used to interpolate or extrapolate beyond that image.

Overall, the effect is to provide a highly efficient annotation image annotation interface where a small number of manual corrections can be propagated via linear interpolation through a relatively large number of images in a sequence to provide high quality annotation data for the transformed images.

For any given transformed image $C_b$, an interpolated or extrapolated bounding box could be determined based on the corrected bounding boxes defined for images $C_a$ and $C_c$ by linearly interpolating coordinates of those bounding boxes based on time index of image $C_b$ (time b) relative to the time indexes of image $C_a$ and $C_c$ (times a and c respectively). That is, based on the position if image $C_b$ in the transformed sequence, relative to the images $C_a$ and $C_c$. The coordinates could, for example, be defining corner points (such as top right and bottom left, or top left and bottom right) or, if the dimensions of the bounding box are unmodified, a single coordinate (e.g. center point or single corner point).

Figure 5:
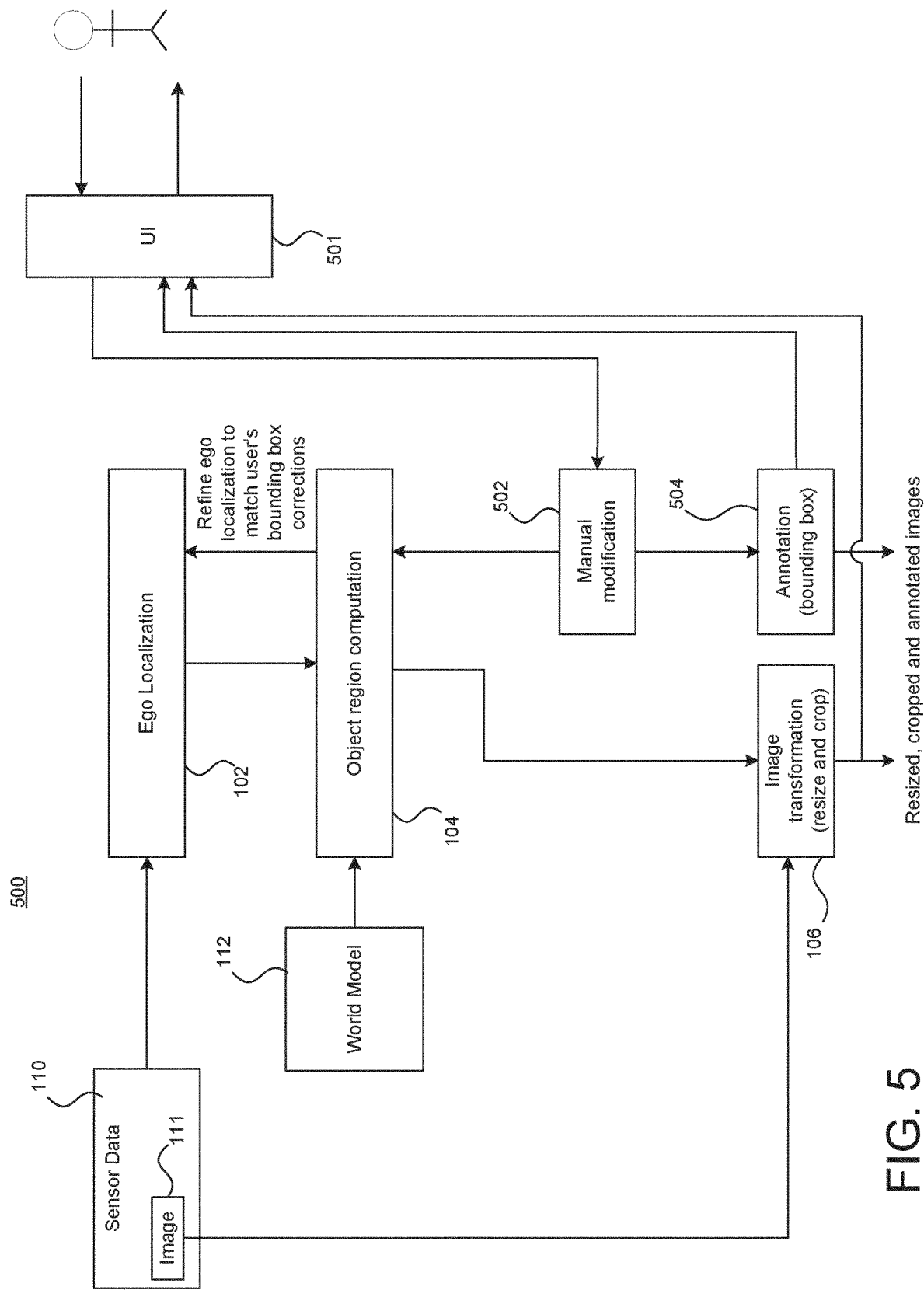
FIG. 5 shows a second extension of the annotation system for refining ego localization data via manual correction of known object annotations.

FIG. 5 shows another extension of the annotation system 500, in which manual corrections of the kind described with reference to FIG. 4A are used to refine the original ego localisation data in an offline context. In this respect, an output of the manual modification component 502 is shown connected to an input of the object region computation component 104, and an output of the latter is shown connected to an input of the ego localisation component 102, representing the ability of the system 500 to correct the ego localization data generated by the ego localization component 102 based on the user's bounding box corrections.

In the context of the annotation system 500 of FIG. 5, the world model 112 is assumed to be ground truth, i.e. no attempt is made to correct the world model 112 and it is assumed that any manual correction that the annotator has been required to make has arisen as a consequence of ego localisation error. Taking the world model 112 as a fixed ground truth, in turn, allows the ego localisation data to be refined based on the user's manual corrections. One way to achieve this is, once the user has defined manual corrections over a sufficient number of images, to back project the resulting corrected 2D bounding boxes into 3D space, and use that information to correct the ego localisation data in 3D space so that is it now consistent with the user's corrections. This is essentially the reverse of the projection from 3D into 2D space that is used to perform the rescaling and transformation. If those transformations were to be re-performed based on the corrected ego localisation data, the images should be rescaled and cropped in a way that is now substantially consistent with the user's manual corrections, i.e. the object would be exactly the right size and centred in the cropped image if the corrected ego localisation data were to be used to re-perform those operations.

For the reasons explained above, with current ego localization technology, it is expected that those corrections would mainly be to orientation, i.e. correcting orientation data of the ego localization data. In some cases, the system could be limited to orientation corrections (i.e. the ego position data is also taken as ground truth), which it be possible to implement based on a single correction, without needing to re-project into 3D space.

FIG. 6 shows a selection of transformed and cropped images that have been obtained using the described techniques, over a range of object distances from 8 metres to around 100 metres. These images are images of traffic lights captured from a sensor equipped vehicle, based on ego localisation and an HD map. It can be seen that the localisation has been performed with sufficient position accuracy to achieve consistent rescaling of the traffic light objects over this range of object distances, and that the depicted crop region is sufficient to accommodate the range of orientation localisation errors encountered over these images.

The images are shown annotated with 2D bounding boxes that have been defined using the techniques described with reference to FIGS. 3A and 4A.

Summarizing the above:
1. Rescaling errors are caused primarily by position localization errors;
2. Cropping errors, i.e. deviation of the object from the center of the cropped images, are caused by orientation localization error, which may be larger—but this can be accommodated using a sufficiently large crop region;
3. For those reasons, manual corrections might only be needed to correct the location (rather than the size) of the 2D bounding box—in practice, it has been found that rescaling errors are negligible with state of the art localization and with HD maps that are available today;
4. In FIG. 4 (interpolation)—the linear interpolation of the user's bounding boxes works because the cropping/rescaling has removed most of the non-linear effects of the ego vehicle's motion.
5. In FIG. 5 (refining ego localization data):
   a. a full implementation—where both ego orientation and position are refined—might require multiple corrections, projected back into 3D space
   b. but a simpler implementation, e.g. where ego orientation is corrected, could be done feasibly on a single image, without reprojection into 3D space.

The above considered annotation of transformed images. In this case, the image is transformed (e.g. scaled and cropped) to match the image to predefined annotation data (the m×n 2D bounding box assumed to lie at the center of the transformed image). However, the annotation techniques can be applied without such transformations. For example, the object projection can be used to annotate the object view within the original image. The above interpolation/extrapolation principles can still be applied in this context—each bounding box projection provides a "baseline" location in that frame, from which corrections to other frames can be extrapolated. This could, for example, be based on a manual correction vector, applied to a reference point (e.g. center point) of the object projection $P_n$ as follows:
- use the world model to automatically compute an object projection $P_n$ for every frame n;
- the user would then correct the projection for, say, two frames—e.g. if the crop region for image n is determined automatically as $(a_n, b_n)$ where $a_n$ is e.g. the top left corner and $b_n$ is the bottom right corner, the user would correct this for frames m and n as:

$$(a_m, b_m) \leftarrow (a_m, b_m) + (\Delta a_m, \Delta b_m)$$

$$(a_n, b_n) \leftarrow (a_n, b_n) + (\Delta a_n, \Delta b_n)$$

The object regions for other frames can them be automatically corrected as $$(a_{m+a}, b_{m+a}) = (a_{m+a}, b_{m+a}) + (\Delta a_{m+a}, \Delta b_{m+a})$$

where $(a_{m+a}, b_{m+a})$ is the initial crop region that you get from the world model, and $(\Delta a_{m+a}, \Delta b_{m+a})$ is derived via linear interpolation or extrapolation of the correction vectors $(\Delta a_m, \Delta b_m)$, $(\Delta a_n, \Delta b_n)$ defined by the user from frames m and n.

References herein to components, functions, modules and the like, denote functional components of a computer system which may be implemented at the hardware level in various ways. This includes the components depicted in FIGS. 1, 3, 5 and 6. A computer system comprises one or more computers that may be programmable or non-programmable. A computer comprises one or more processors which carry out the functionality of the aforementioned functional components. A processor can take the form of a general-purpose processor such as a CPU (Central Processing unit) or accelerator (e.g. GPU) etc. or more specialized form of hardware processor such as an FPGA (Field Programmable Gate Array) or ASIC (Application-Specific Integrated Circuit). That is, a processor may be programmable (e.g. an instruction-based general-purpose processor, FPGA etc.) or non-programmable (e.g. an ASIC). Such a computer system may be implemented in an onboard or offboard context.

Practical applications of image recognition include autonomous vehicles and other robotic systems. The present techniques could also be implemented in simulation, e.g. for the purpose of testing and/or training components. In this context, the techniques could be applied to simulated (synthetic) image data generated using suitable sensor models, using simulated ego localization data

The invention claimed is:

1. A method of annotating known objects in road images captured from a sensor-equipped vehicle, the method implemented in an annotation system and comprising:
   - receiving at the annotation system a road image containing a view of a known object;
   - receiving ego localization data, as computed in a map frame of reference, via localization applied to sensor data captured by the sensor-equipped vehicle, the ego localization data indicating an image capture pose of the road image in the map frame of reference;
   - determining, from a predetermined road map, an object location of the known object in the map frame of reference, the predetermined road map representing a road layout the map frame of reference, wherein the known object is one of: a piece of road structure, and an object on or adjacent a road;
   - computing, in an image plane defined by the image capture pose, an object projection, by projecting an object model of the known object from the object location into the image plane; and
   - storing, in an image database, image data of the road image, in association with annotation data of the object projection for annotating the image data with a location of the known object in the image plane.

2. The method of claim 1, comprising the step of using the image data and the associated annotation data to train an image recognition component to recognize features of the known object.

3. The method of claim 1, wherein the annotation data is generated automatically by applying at least one correction the object projection using at least one additional piece of information about the object.

4. The method of claim 1, wherein the annotation data is generated semi-automatically by:
   - displaying the image data on an annotation interface, and using the object projection to annotate the displayed image data with an initial location of the object; and
   - receiving a manual correction for correcting the initial location, the annotation data generated based on the manual correction.

5. The method of claim 4, wherein the image data is extracted from within a crop region defined by the object projection, the initial location being a predetermined location within the crop region.

6. The method of claim 3, wherein:
   - the annotation data is optionally generated semi-automatically by:
     - displaying the image data on an annotation interface, and using the object projection to annotate the displayed image data with an initial location of the object; and
     - receiving a manual correction for correcting the initial location, the annotation data generated based on the manual correction, and
   - the annotation data is used to apply a correction to the ego localization data, and thereby generate corrected ego localization data consistent with the annotation data.

7. The method of claim 6, wherein the correction is applied to orientation data of the ego localization data, without modifying position data of the ego localization data.

8. The method of claim 4, applied to at least two road images, to automatically or semi-automatically generate respective annotation data for the at least two road images, the ego localization data indicating respective image capture poses for the at least two road images.

9. The method of claim 8, wherein the at least two road images form part of a time sequence of road images, the ego localization data indicating an image capture pose for each road image of the time sequence;
   - wherein the method comprises, for at least a third road image of the time sequence of images:
     - computing an object projection for the third road image, by projecting the object model into an image plane defined by the image capture pose of the third road image, and
     - using the object projection computed for the third road image to automatically generate annotation data for annotating image data of the third road image with a location of the known object, via interpolation or extrapolation of the manual corrections applied to the at least two images.

10. The method of claim 9, wherein said interpolation or extrapolation is linear interpolation or extrapolation.

11. The method of claim 9, wherein the image data of each of the time sequence of road images is extracted from a crop region defined by the object projection computed for that image, wherein said interpolation or extrapolation is used to determine an offset from a predetermined location within the crop region of the third road image.

12. The method of claim 1, wherein the method is applied in order to extract a scenario for running in a simulator.

13. The method of claim 1, wherein the annotation data includes a type of the known object derived from the predetermined object.

14. The method of claim 1, wherein:
the road image is one of a time sequence of road images, the ego localization data having been computed in the map frame of reference by applying vision-based localization to the time sequence of images, the sensor data comprising data of the images;
the ego localization data has been computed in the map frame of reference by applying non-vision-based localization to at least one other type of sensor data associated with the image, or
the ego localization data has been computed using a combination of vision-based and non-vision based localization.

15. The method of claim 1, wherein the road map is a High-Definition Map for use in autonomous driving.

16. A computer system comprising one or more computers configured to carry out the steps of:
receiving a road image containing a view of a known object;
receiving ego localization data, as computed in a map frame of reference, via localization applied to sensor data captured by a sensor-equipped vehicle, the ego localization data indicating an image capture pose of the road image in the map frame of reference;
determining, from a predetermined road map, an object location of the known object in the map frame of reference, the predetermined road map representing a road layout the map frame of reference, wherein the known object is one of: a piece of road structure, and an object on or adjacent a road;
computing, in an image plane defined by the image capture pose, an object projection, by projecting an object model of the known object from the object location into the image plane; and
storing, in an image database, image data of the road image, in association with annotation data of the object projection for annotating the image data with a location of the known object in the image plane.

17. A non-transitory media embodying computer-readable instructions configured, upon execution on one or more processors, to cause the steps of:
receiving a road image containing a view of a known object;
receiving ego localization data, as computed in a map frame of reference, via localization applied to sensor data captured by a sensor-equipped vehicle, the ego localization data indicating an image capture pose of the road image in the map frame of reference;
determining, from a predetermined road map, an object location of the known object in the map frame of reference, the predetermined road map representing a road layout the map frame of reference, wherein the known object is one of: a piece of road structure, and an object on or adjacent a road;
computing, in an image plane defined by the image capture pose, an object projection, by projecting an object model of the known object from the object location into the image plane; and
storing, in an image database, image data of the road image, in association with annotation data of the object projection for annotating the image data with a location of the known object in the image plane.

18. The computer system of claim 16, wherein the annotation data is generated automatically by applying at least one correction the object projection using at least one additional piece of information about the object.

19. The computer system of claim 16, wherein the annotation data is generated semi-automatically by:
displaying the image data on an annotation interface, and using the object projection to annotate the displayed image data with an initial location of the object; and
receiving a manual correction for correcting the initial location, the annotation data generated based on the manual correction.

20. The computer system of claim 19, wherein the image data is extracted from within a crop region defined by the object projection, the initial location being a predetermined location within the crop region.

* * * * *